United States Patent
Kim et al.

(10) Patent No.: US 10,103,906 B2
(45) Date of Patent: Oct. 16, 2018

(54) METHOD AND APPARATUS FOR ATTENUATING INTERFERENCE OR CANCELLING INTERFERENCE IN FILTER BANK MULTICARRIER SYSTEM

(71) Applicant: Samsung Electronics Co., Ltd, Gyeonggi-do (KR)

(72) Inventors: Kyeongyeon Kim, Hwaseong-si (KR); Yeohun Yun, Hwaseong-si (KR); Chanhong Kim, Hwaseong-si (KR); Taeyoung Kim, Seongnam-si (KR); Jiyun Seol, Seongnam-si (KR); Byunghwan Lee, Yongin-si (KR); Ming Hoka, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 15/505,599

(22) PCT Filed: Aug. 21, 2015

(86) PCT No.: PCT/KR2015/008755
§ 371 (c)(1),
(2) Date: Feb. 21, 2017

(87) PCT Pub. No.: WO2016/039537
PCT Pub. Date: Mar. 17, 2016

(65) Prior Publication Data
US 2017/0272281 A1    Sep. 21, 2017

(30) Foreign Application Priority Data
Aug. 21, 2014  (KR) ........................ 10-2014-0108895

(51) Int. Cl.
*H04L 25/03* (2006.01)
*H04J 11/00* (2006.01)
*H04L 27/26* (2006.01)

(52) U.S. Cl.
CPC .... *H04L 25/03012* (2013.01); *H04J 11/0036* (2013.01); *H04L 25/03159* (2013.01);
(Continued)

(58) Field of Classification Search
CPC ....... H04L 2025/03426; H04L 27/2636; H04L 2025/03522; H04L 25/0232; H04L 25/0236; H04L 25/03159
(Continued)

(56) References Cited

U.S. PATENT DOCUMENTS 7,606,137 B2 * 10/2009 Shattil ................. H04B 7/0857
 370/208
8,194,531 B2  6/2012 Lele et al.
(Continued)

OTHER PUBLICATIONS

International Search Report in connection with International Application No. PCT/KR2015/008755 dated Dec. 7, 2015, 3 pages.
(Continued)

*Primary Examiner* — Emmanuel Bayard

(57) ABSTRACT

This disclosure relates to a 5G or a pre-5G communication system to be provided to support a higher data rate following 4G communication systems such as LTE. A method according to one embodiment of the present invention is a method for attenuating interference of a signal received in a receiver of a filter bank multicarrier (FBMC) system, the method comprising the steps of: separately extracting data and a reference signal in a received FMBC symbol; obtaining a diagonal element channel of a desired symbol through a channel estimation from the extracted reference signal; generating an interference channel matrix of a non-diagonal component of the desired symbol, a diagonal component and (Continued)

a non-diagonal component of an interference symbol using a channel estimated diagonal component; reconfiguring to a banded channel matrix using an interference channel matrix; and attenuating the interference contained in the extracted data using the reconfigured banded channel matrix information and filter information of a transmitter of the filter bank multicarrier system.

20 Claims, 10 Drawing Sheets

(52) U.S. Cl.
CPC .... *H04L 27/264* (2013.01); *H04L 2025/0342* (2013.01); *H04L 2025/03808* (2013.01)

(58) Field of Classification Search
USPC .......................................... 375/346–348, 350
See application file for complete search history.

(56) References Cited

U.S. PATENT DOCUMENTS

| | | | | |
|---|---|---|---|---|
| 2003/0002450 | A1* | 1/2003 | Jalali | H04B 7/0434 370/294 |
| 2003/0128656 | A1* | 7/2003 | Scarpa | H04L 25/0236 370/203 |
| 2004/0012387 | A1* | 1/2004 | Shattil | H04B 7/0857 324/225 |
| 2004/0076239 | A1* | 4/2004 | Yu | H04L 25/03159 375/260 |
| 2005/0238108 | A1* | 10/2005 | Suh | H04L 1/0001 375/260 |
| 2006/0126753 | A1* | 6/2006 | Jwa | H04B 1/71052 375/267 |
| 2006/0153283 | A1* | 7/2006 | Scharf | H04B 1/7107 375/148 |
| 2007/0060058 | A1* | 3/2007 | Shattil | H04B 7/0857 455/63.1 |
| 2007/0263738 | A1* | 11/2007 | Jitsukawa | H04L 25/03834 375/260 |
| 2009/0016461 | A1* | 1/2009 | Jitsukawa | H04B 7/04 375/267 |
| 2010/0061223 | A1* | 3/2010 | Kim | H04L 5/0044 370/208 |
| 2012/0243625 | A1 | 9/2012 | Berg | |
| 2013/0188589 | A1* | 7/2013 | Nakashima | H04B 7/0404 370/329 |
| 2014/0022979 | A1* | 1/2014 | Chen | H04B 7/15578 370/315 |
| 2014/0185720 | A1* | 7/2014 | Liang | H04B 7/08 375/347 |
| 2015/0215010 | A1* | 7/2015 | Shim | H04B 7/0413 375/341 |

OTHER PUBLICATIONS

Written Opinion in connection with International Application No. PCT/KR2015/008755 dated Dec. 7, 2015, 6 pages.

Gustavo J. Gonzalez et al., "Uplink CFO compensation for FBMC multiple access and OFDMA in a high mobility scenario," Physical Communication, vol. II, Jun. 2014, pp. 56-66.

Tobias Hidalgo Stitz et al., "CFO estimation and correction in a WiMAX-like FBMC system," IEEE 10th Workshop on SPA WC '09, Jun. 24, 2009, pp. 633-637.

Yao Cheng et al., "Intrinsic interference mitigating coordinated beamforming for the FBMC/OQAM based downlink," EURASIP Journal on Advances in Signal Processing, Jun. 9, 2014, pp. 3-15.

Rostom Zakaria et al., "Intrinsic interference reduction in a filter bank-based multicarrier using QAM modulation," Physical Communication, vol. 11, Jun. 2014, pp. 15-24.

* cited by examiner

METHOD AND APPARATUS FOR ATTENUATING INTERFERENCE OR CANCELLING INTERFERENCE IN FILTER BANK MULTICARRIER SYSTEM

TECHNICAL FIELD

The present invention relates to a method and an apparatus for attenuating or cancelling interference of a channel in a filter-bank multi-carrier (hereinafter, referred to as "FBMC") wireless communication system.

BACKGROUND ART

To meet a demand for radio data traffic that is on an increasing trend after commercialization of a 4G communication system, efforts to develop an improved 5G communication system or a pre-5G communication system have been conducted. For this reason, the 5G communication system or the pre-5G communication system is called a communication system beyond 4G network or a system since the post LTE.

To achieve a high data transmission rate, the 5G communication system is considered to be implemented in a super high frequency (mmWave) band (for example, like 60 GHz band). To reduce a path loss of a radio wave and increase a transfer distance of the radio wave in the super high frequency band, in the 5G communication system, technologies of beam-forming, a massive MIMO, a frill dimensional MIMO (FD-MIMO), an array antenna, analog beam-forming, and a large scale antenna have been discussed.

Further, to improve the network of the system, in the 5G communication system, technologies of an improved small cell, an advanced small cell, a cloud radio access network (cloud RAN), an ultra-dense network, device-to-device communication (D2D), wireless backhaul, a moving network, cooperative communication, coordinated multi-points (CoMP), interference cancellation, or the like have been developed.

In addition to this, in the 5G system, hybrid FSK and QAM modulation (FQAM) and sliding window superposition coding (SWSC) which are an advanced coding modulation (ACM) scheme and a filter bank multi carrier (FBMC), a non orthogonal multiple access (NOMA), and a sparse code multiple access (SCMA) which are an advanced access technology, or the like have been developed.

As a demand for data in the wireless communication system is increased, for the wireless communication systems using a CDMA scheme represented by the 3 generation (3G) mobile communication scheme to transmit a larger amount of data at a high speed, fourth generation (4G) mobile communication systems end up using an OFDMA scheme. The OFDMA scheme may use a plurality of orthogonal frequency components to transmit data to transmit a larger amount of data than the CDMA scheme that is the 3G wireless communication scheme at a high speed. The OFDMA scheme has been adopted in various wireless communication systems such as Wibro as well as in mobile communication systems such as LTE and LTE-A.

However, as the amount of data requested by a user is increased exponentially, wireless communication systems beyond 4G require a multiple access technology more effective than cyclic prefixed orthogonal frequency division multiplexing (CP-OFDM).

As one of the representative candidate technologies that have emerged as one of the technologies for transmitting a larger amount of data than the amount of data transmitted in the OFDMA based wireless communication system, there is an FBMC wireless communication scheme.

Comparing with the existing CP-OFDM, the FBMC system is expected to obtain a big gain in a symbol transmission rate in that it does not transmit the CP. Further, to reduce a guard band due to the spectrum confinement characteristics that energy is confined in a signal band well, the FBMC system is expected to more increase the number of supportable equipments in an asynchronous heterogeneous network that does not use continued spectrum or machine type communication. From the viewpoint of a transmit signal, a representative feature of the FBMC is that the used filter occupies a long interval on a time base and symbols are overlappingly transmitted for an effective symbol transmission rate. Consequently, when continuously transmitting long data, the FBMC wireless communication scheme may implement the same symbol transmission rate as the CP-OFDM scheme for transmitting a symbol without CP.

When there is only additive noise, the overlapping structure in the FBMC system shows the same reception performance as the case in which the symbols do not overlap each other but when the FBMC system suffers from multipath fading, interference occurs from adjacent symbols due to the overlapping structure. Further, since the FBMC does not use the CP, after the FBMC suffers from the multipath fading, the interference occurs, which appears as non-diagonal components when viewing a frequency base channel. Therefore, when a 1 tap equalizer used in the CP-OFDM considering the case in which there is no interference due to the interference components is used in the FBMC system, the reception performance may deteriorate.

DISCLOSURE OF INVENTION

Technical Problem

The present invention has been made in order to solve the above problems, and an object of the present invention is to provide a method and an apparatus for attenuating interference and cancelling interference to reduce interference in an FBMC system.

Another object of the present invention is to provide a method and an apparatus for attenuating interference and cancelling interference to recover a symbol transmitted to an interference channel in an FBMC system.

Solution to Problem

In order to achieve the objects, according to an embodiment of the present invention, a receiver of a filter bank multicarrier (FBMC) system for attenuating interference of a received signal, the receiver may include: a signal extractor separately extracting data and a reference signal in a received FMBC symbol; a channel estimator obtaining a diagonal element channel of a desired symbol through a channel estimation from the extracted reference signal; an interference channel matrix recovering unit generating an interference channel of a non-diagonal component of the desired symbol, a diagonal component and a non-diagonal component of an interference symbol using the channel estimated signal; a bended channel reconfiguration unit reconfiguring to a banded channel matrix using the interference channel; and an interference attenuator attenuating the interference contained in the extracted data using the reconfigured banded channel matrix information and filter information of a transmitter of the filter bank multicarrier system.

In order to achieve the objects, according to an embodiment of the present invention, an apparatus for removing interference of a signal received in a receiver of a filter bank multicarrier (FBMC) system, the apparatus may include: a signal extractor separately extracting data and a reference signal in a received FMBC symbol; a channel estimator obtaining a diagonal element channel of a desired symbol through a channel estimation from the extracted reference signal; an interference channel matrix recovering unit generating an interference channel of a non-diagonal component of the desired symbol, a diagonal component and a non-diagonal component of an interference symbol using the channel estimated signal; a bended channel reconfiguration unit reconfiguring to a banded channel matrix using the interference channel; an interference signal generator generating an interference signal using filter information of a transmitter of the filter bank multicarrier system, the reconfigured banded channel matrix information, and fed back information; and an addition unit computing a difference of the interference signal from the extracted data.

In order to achieve the objects, according to an embodiment of the present invention, a method for attenuating interference of a signal received in a receiver of a filter bank multicarrier (FBMC) system, the method may include: separately extracting data and a reference signal in a received FMBC symbol; obtaining a diagonal element channel of a desired symbol through a channel estimation from the extracted reference signal; generating an interference channel matrix of a non-diagonal component of the desired symbol, a diagonal component and a non-diagonal component of an interference symbol using a channel estimated diagonal component; reconfiguring to a banded channel matrix using the interference channel matrix; and attenuating the interference contained in the extracted data using the reconfigured banded channel matrix information and filter information of a transmitter of the filter bank multicarrier system.

In order to achieve the objects, according to an embodiment of the present invention, a method for removing interference of a signal received in a receiver of a filter bank multicarrier (FBMC) system, the method may include: separately extracting data and a reference signal in a received FMBC symbol; obtaining a diagonal element channel of a desired symbol through a channel estimation from the extracted reference signal; generating an interference channel matrix of a non-diagonal component of the desired symbol, a diagonal component and a non-diagonal component of an interference symbol using a channel estimated diagonal component; reconfiguring to a banded channel matrix using the interference channel matrix; generating an interference signal using filter information of a transmitter of the filter bank multicarrier system, the reconfigured banded channel matrix information, and fed back information; and computing a difference of the interference signal from the extracted data.

Advantageous Effects of Invention

According to the embodiment of the present invention, it is possible to secure the channel information on the interference component in the FBMC system and cancel or reduce the interference by the equalization, the computation of the log likelihood ratio (LLT), etc. Further, according to the embodiment of the present invention, it is possible to secure the interference component channel having low complexity. Further, according to the embodiment of the present invention, it is possible to more effectively recover the transmitted symbol in the FBMC system.

MODE FOR THE INVENTION

Figure 1:
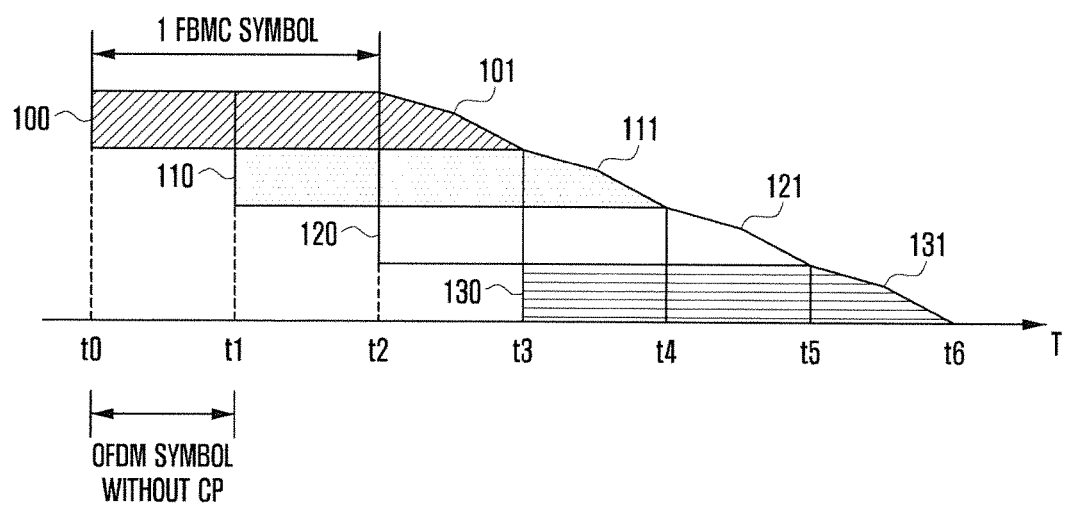
FIG. 1 is an exemplified diagram of a symbol overlappingly transmitted on a time base in an FBMC system using a QAM scheme.

Hereinafter, various embodiments will be described in detail with reference to the accompanying drawings. At this time, it is noted that like reference numerals denote like elements in appreciating the drawings. Further, the accompanying drawings of the present invention are provided to help understanding of the present invention and therefore it is to be noted that the present invention is not limited to forms, dispositions, etc., illustrated in the drawings of the present invention. Moreover, detailed descriptions related to well-known functions or configurations will be ruled out in order not to unnecessarily obscure the subject matter of the present invention. It is to be noted that only parts necessary to understand operations according to various embodiments of the present invention will be described below and the description of other parts will be omitted so as not to unnecessarily obscure the subject matter of the present invention.

FIG. 1 is an exemplified diagram of a symbol overlappingly transmitted on a time base in an FBMC system using a QAM scheme.

Referring to FIG. 1, as FMBC symbols 100, 110, 120, and 130, FBMC symbols having a length two times as large as a length M of an OFMD symbol without CP are illustrated as an example. That is, the case in which an over-lapping factor L is 2 is illustrated. In FIG. 1, each point in time may be a transmission time unit of the OFDM symbols without CP. That is, t0 to t1, t1 to t2, t2 to t3, t3 to t4, t4 to t5, or t5 to t6 may be the transmission time interval of the OFDM symbol without CP.

A length M of the FMBC symbols 100, 110, 120, and 130 illustrated in FIG. 1 may be the FMBC symbols having a length two times as large as the length M of the OFDM symbol without CP. Describing in more detail this, the first FBMC symbol 100 is transmitted from the interval t0 to the interval t2, the second FBMC symbol is transmitted from the interval t1 to the interval t3, the third FBMC symbol 120 is transmitted from the interval t2 to the interval t4, and the fourth FBMC symbol 130 is transmitted from the interval t3 to the interval t5.

Further, each of the FBMC symbols 100, 110, 120, and 130 is transmitted in a form in which it has an interference from symbols of adjacent time intervals for each OFDM symbol without one CP like the third FBMC symbol 120, when a variation of a transmission interval, for example, a change from a transmitting point in time to a receiving point in time or a change from the receiving point in time to the transmitting point in time does not occur.

Describing in more detail this, in the symbol transmission interval t2 to t3 having the same length as the OFDM symbol without CP of a head portion of the third FMBC symbol 120, an interference occurs in the symbol transmission interval having the same length as the OFDM symbol without CP of a tail portion of the second FMBC symbol 110. Further, in the symbol transmission interval t3 to t4 having the same length as the OFDM symbol without CP of a tail portion of the third FMBC symbol 120, interference occurs in the symbol transmission interval having the same length as the OFDM symbol without CP of a head portion of the fourth FMBC symbol 130.

When the FBMC scheme using offset QAM (OQAM) is used, the transmitted symbols overlap in a M/2 unit, and therefore the number of overlapping symbols is increased but the transmission of the FBMC symbols using the QAM scheme and the transmission structure described above are the same.

Further, as can be appreciated from FIG. 1, it can be appreciated that energies 101, 111, 121, and 131 are present even in a time interval after the symbol transmission is completed in the FBMC symbols 100, 110, 120, and 130. This is a phenomenon occurring when the transmitted symbol suffers from multipath fading, which may act as interference on an adjacent symbol.

Describing in more detail this, in the symbol transmission interval t2 to t3 having the same length as the OFDM symbol without CP of a head portion of the third FMBC symbol 120, an interference occurs in the symbol transmission interval having the same length as the OFDM symbol without CP of a tail portion of the second FMBC symbol 110. In addition, in the symbol transmission interval t2 to t3 having the same length as the OFDM symbol without CP of the head portion of the third FMBC symbol 120, an interference of the symbol energy 101 occurring due to the multipath after the transmission of the first symbol 100 is completed occurs. Further, in the symbol transmission interval t3 to t4 having the same length as the OFDM symbol without CP of a tail portion of the third FMBC symbol 120, interference occurs in the symbol transmission interval having the same length as the OFDM symbol without CP of a head portion of the fourth FMBC symbol 130. In addition, in the symbol transmission interval t2 to t3 having the same length as the OFDM symbol without CP of the tail portion of the third FMBC symbol 120, an interference of the symbol energy 111 occurring due to the multipath after the transmission of the second symbol 110 is completed occurs.

Due to these phenomena, the interference occurs from L−1 symbols before/after the desired symbol depending on the over-lapping factor L. Further, due to the multipath fading, a previous symbol affects a next symbol, and therefore the interference occurs from L symbols before the transmission of the desired symbol and L−1 symbols after the transmission of the desired symbols. Hereinafter, for convenience, suppose that an index of the symbol is k and an index of the desired symbol is "k=0". Next, the adjacent symbols transmitted before the desired symbol have indexes of "k=−L, −L+1, . . . , −1" and the adjacent symbols after the transmission point in time of the desired symbol have indexes of "k=1, 2, . . . , L−1". Further, describing a frequency base channel at each symbol, since there is no CP, an inter-subcarrier interference occurs, which appears as non-diagonal components of the frequency base channel. That is, in the FBMC system, an inter-symbol interference (ISI) due to the overlapping transmission structure and an inter-carrier interference (ICI) occurring due to the absence of CP occur.

Suppose that the channel is little changed within the overlapping FMBC symbol block transmitted onto the channel that is being observed. When the receiving apparatus acquires the desired FBMC symbol, the time base channel is acquired from the diagonal components of the desired symbol and the overall channel matrix of the desired symbol and the interference symbol may be recovered using the time base channel of the overall block observed. However, in the case of using the intuitive method, when the length of the overall FMBC symbol block is set to be N, a computation amount has a computation amount of $N^3$ order. That is, the computation amount is very large, and thus the load of the apparatus may be increased.

Therefore, the present invention provides a receiver apparatus and a receiving method for effectively reducing the interference.

As the simplest methods, there are methods for cancelling or reducing interference by considering the interference in an equalizer, a soft de-mapper, or the like if we know the interference channel. However, in the case of using the existing channel estimation method, only the diagonal components of the desired FBMC symbol may be obtained. According to the present invention, a method for obtaining interference components (non-diagonal components) at the desired symbol itself occurring from the diagonal components of the desired symbol due to the absence of CP and interference components (diagonal components and non-orthogonal components) of an adjacent symbol occurring due to an overlapping transmission will be described below.

Figure 2A:
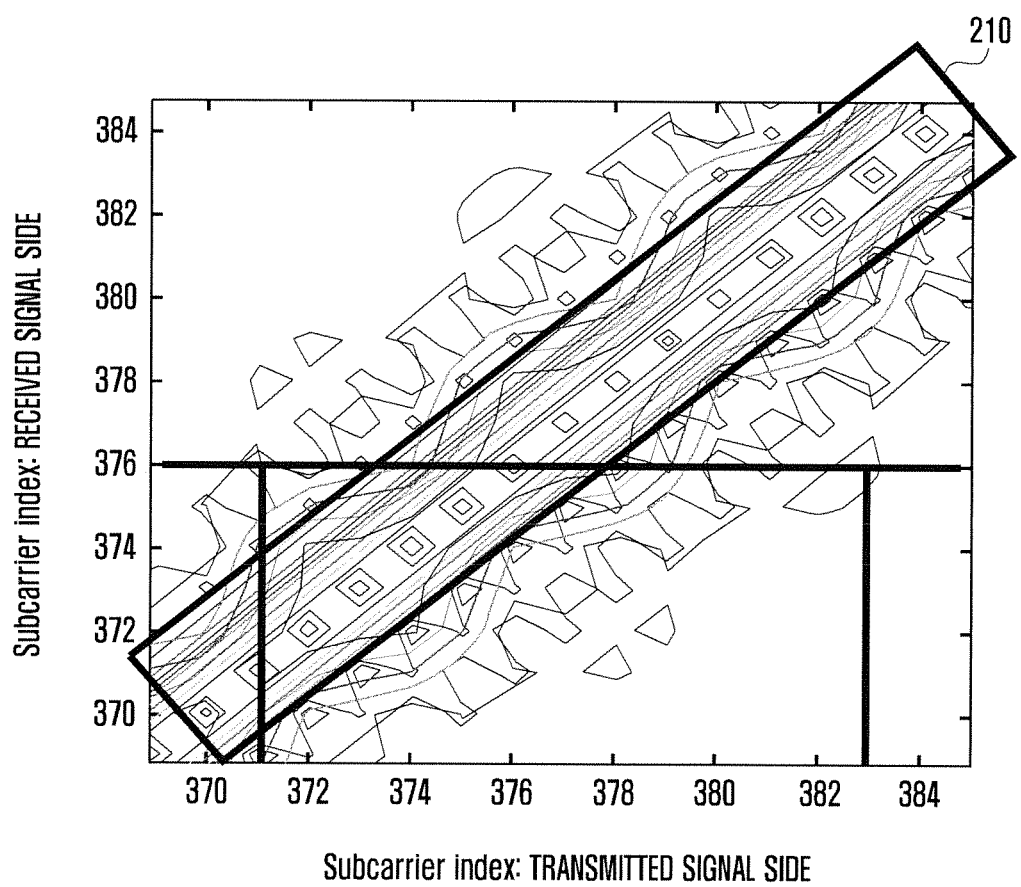
FIG. 2A is a distribution diagram of diagonal components and non-diagonal components of a signal using transmit and receive frequency indexes of an FBMC symbol at the time of transmitting an FBMC symbol.

FIG. 2A is an energy distribution diagram of diagonal components and non-diagonal components of a channel, when viewing some of the transmit and receive frequencies at the time of transmitting one FBMC symbol.

Referring to FIG. 2A, a vertical axis represents subcarrier indexes in terms of a received signal and a horizontal axis represents subcarrier indexes in terms of a transmitted signal. Here, FIG. 2A illustrates a graph of a simulation of an energy distribution of a channel affecting these indexes.

FIG. 2A illustrates, for example, the case in which the length M of the OFDM symbol is 512 and the over-lapping factor L is 2.

As illustrated in FIG. 2A, the energy distribution of the channel is mainly intensified at a position of a diagonal component 210 to which the same index is mapped. However, the energy is distributed even at positions where the diagonal components are not present. For example, in FIG. 2A, describing the energy distribution for a receive subcarrier index 376 in terms of the received signal, it can be appreciated that energy is distributed from a transmit subcarrier 371 to a transmit subcarrier 383. That is, it can be appreciated that at the time of detecting a signal corresponding to a subcarrier 376, a received signal corresponding to the subcarrier 376 may be affected by all transmitted signals from a subcarrier 371 to a subcarrier 383. Generally, the energy distribution symmetrically appears with respect to the diagonal components and it is to be noted that since FIG. 2A illustrates some of the subcarriers, and therefore there is a portion where the energy distribution appears asymmetrically.

Referring to FIG. 2A, when considering the fact that the channel matrix on the frequency base is dominant in the diagonal components and the filter, it may be appreciated that a channel of an interval spaced from the diagonal component by a predetermined value has a great effect on reception performance. The components up to the interval spaced from the diagonal component in the channel matrix at the frequency base by L give an influence as a main channel interference. Therefore, in the present invention, some of the interference channels are recovered using only the information spaced from the diagonal components by a predetermined value based on the energy distribution of FIG. 2A and the channel having the so recovered band structure may be illustrated like FIG. 2B.

Figure 2B:
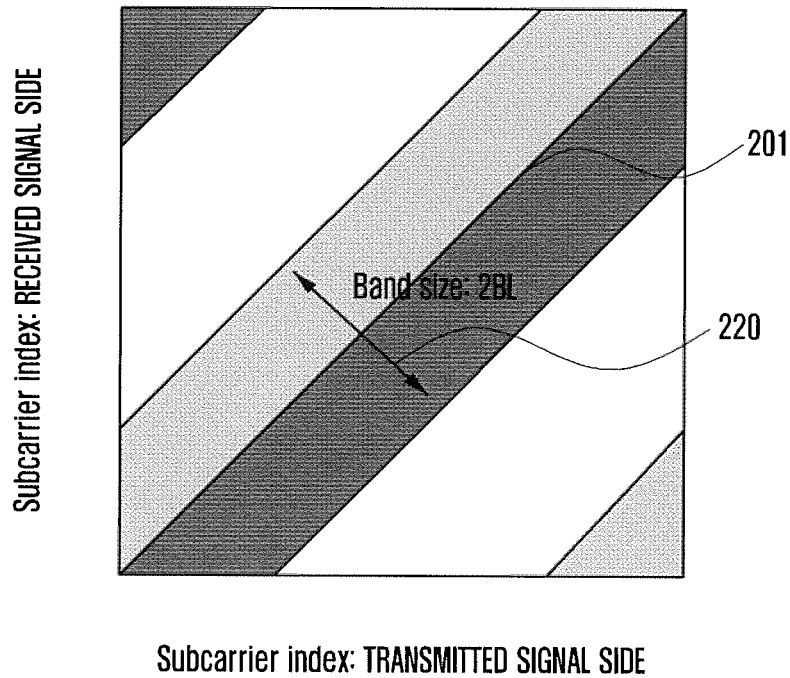
FIG. 2B is an exemplified diagram of a channel having a recovered band structure using components spaced from the diagonal components by a predetermined value in the transmit and receive frequency indexes at the time of transmitting the FBMC symbol.

FIG. 2B is an exemplified diagram of a channel having a recovered band structure using components spaced from the diagonal components by a predetermined value in the transmit and receive frequency indexes at the time of transmitting the FBMC symbol.

The recovered channel structure having the band structure will be described in more with reference to FIG. 2B. Referring to FIG. 2B, the diagonal component 201 connecting between the same points where the transmit frequency index and the receive frequency index are the same becomes the energy position of the FBMC symbol at the transmit subcarrier index and the FMBC symbol at the receive subcarrier index. Further, a width of the band component may have a BL to the left and right with respect to the diagonal component 201, that is, a value of "2BL". That is, all the components having energy distributed from the diagonal component 201 as illustrated in FIG. 2A is not considered but B non-diagonal components per distance of a multiple of L to the left and right from the diagonal component 201 are present. B determining a size of the band may be a value that may be adjusted depending on characteristics of the channel and a confinement value. In the case of most filters in which the energy distribution of the filter is intensified, the channel corresponding to a multiple of L gives a great influence and the position of the non-diagonal component mainly giving an influence depending on the energy distribution shape may be changed. Here, the confinement value of the filter, the over-lapping factor L, the energy distribution of the filter, or the like may be information that may be changed depending on the filter. Further, the values need to be known by a transmitter and a receiver, and therefore when the information is obtained from a base station or the values are selected by a terminal, the information and the values are information that may be fed back to the base station and may be known even by the base station.

The interference channel to be recovered in the FBMC system consists of the non-diagonal components of the desired symbol and the interference symbol and the diagonal components of the adjacent interference symbols. The diagonal components of the interference symbol are changed depending on the index k and the non-diagonal components of each symbol are changed depending on the distance d (for example, d=L, 2L, . . . , BL at the left and right of the diagonal component) from the diagonal component 201 of the desired symbol and the interference symbol index. Here, the case of d=0 is considered as the diagonal components. The time base channel may be obtained from the diagonal components of the desired FMBC symbol and may be obtained by a scale, a circular shift, and fast Fourier transform (FFT). Here, the scale is a function of the distance d and the adjacent symbol index k from the diagonal component and the shift degree is a function of the adjacent symbol index. According to the embodiment of the present invention, 2L symbols are considered including previous and next symbols to detect one symbol and the banded channel by BL to the left and right for each symbol is considered. The diagonal components or the non-diagonal components having a length of N are obtained depending on the specific symbol k and the distance d from the diagonal component by the scale, the circular shift, and the fast Fourier transform of the time base channel as described above.

Figure 2C:
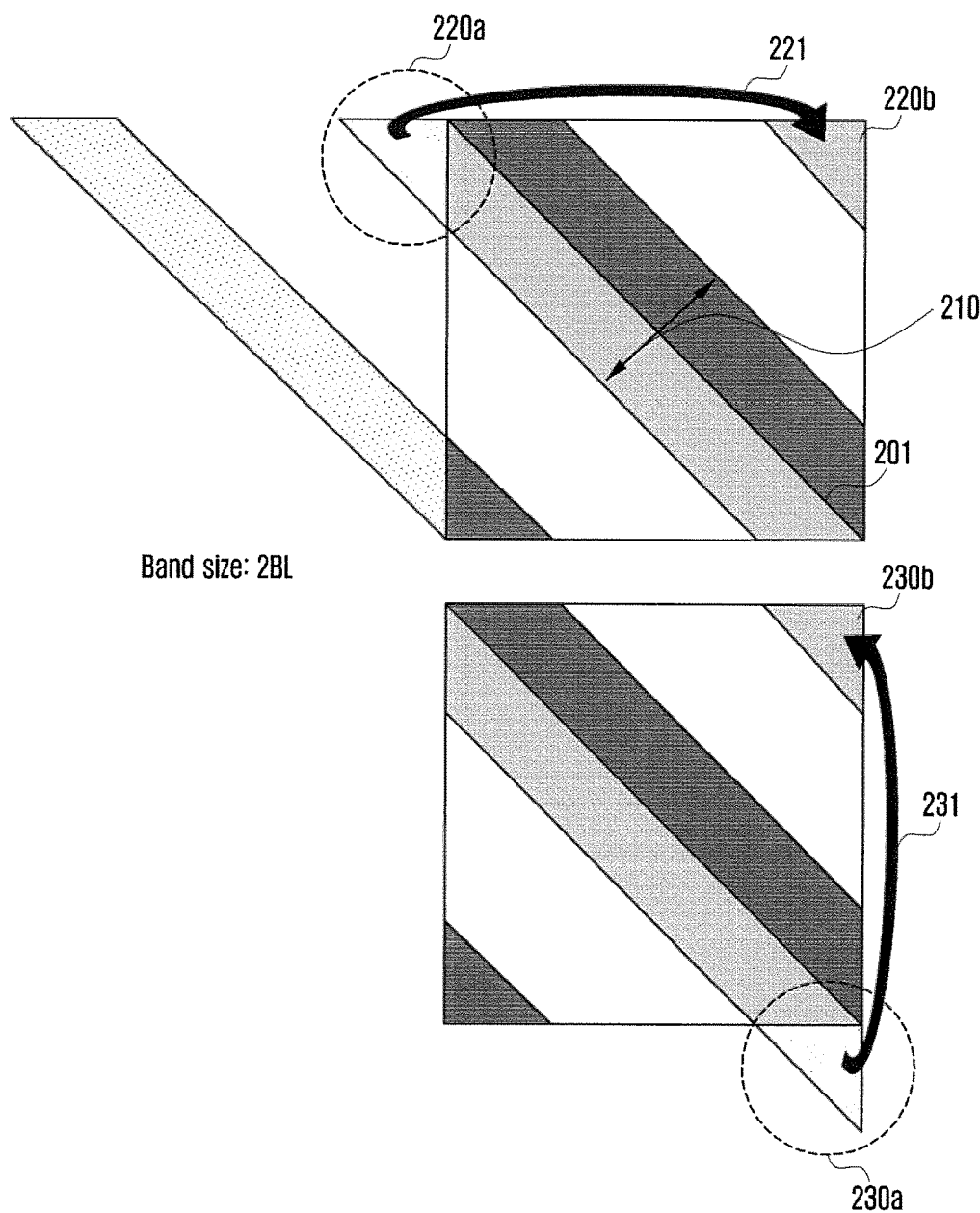
FIG. 2C is a conceptual diagram for describing a method for reconfiguring a channel into a banded channel form according to an embodiment of the present invention.

FIG. 2C illustrates a method for reconfiguring a banded channel of FIG. 2B using the so obtained diagonal or non-diagonal components, respectively. That is, in the case of the previous symbol and the desired symbol, the diagonal matrix having a vector of N is formed and then is circularly shifted by d, thereby making one non-diagonal component. Further, if 2B non-diagonal components are added after this is repeatedly performed by 2B while changing d, the banded channel may be obtained as illustrated in FIG. 2B.

Hereinafter, in the case of the symbol, the vector having a length of N is circularly shifted by −d and then is made into the diagonal matrix and is circularly shifted by d again, thereby making one non-diagonal component. Next, the 2B non-diagonal components generated by repeatedly performing it by 2B are added to the diagonal components to obtain the banded channel as illustrated in FIG. 2B.

As another method for making one non-diagonal component, the frequency base channel may be used. That is, it may be obtained from a value obtained by performing the fast Fourier transform (FFT) on a scale term and circular convolution of the frequency base channel.

Next, apparatuses for recovering an interference channel of an FMBC symbol received by the foregoing method will be described.

Figure 4:
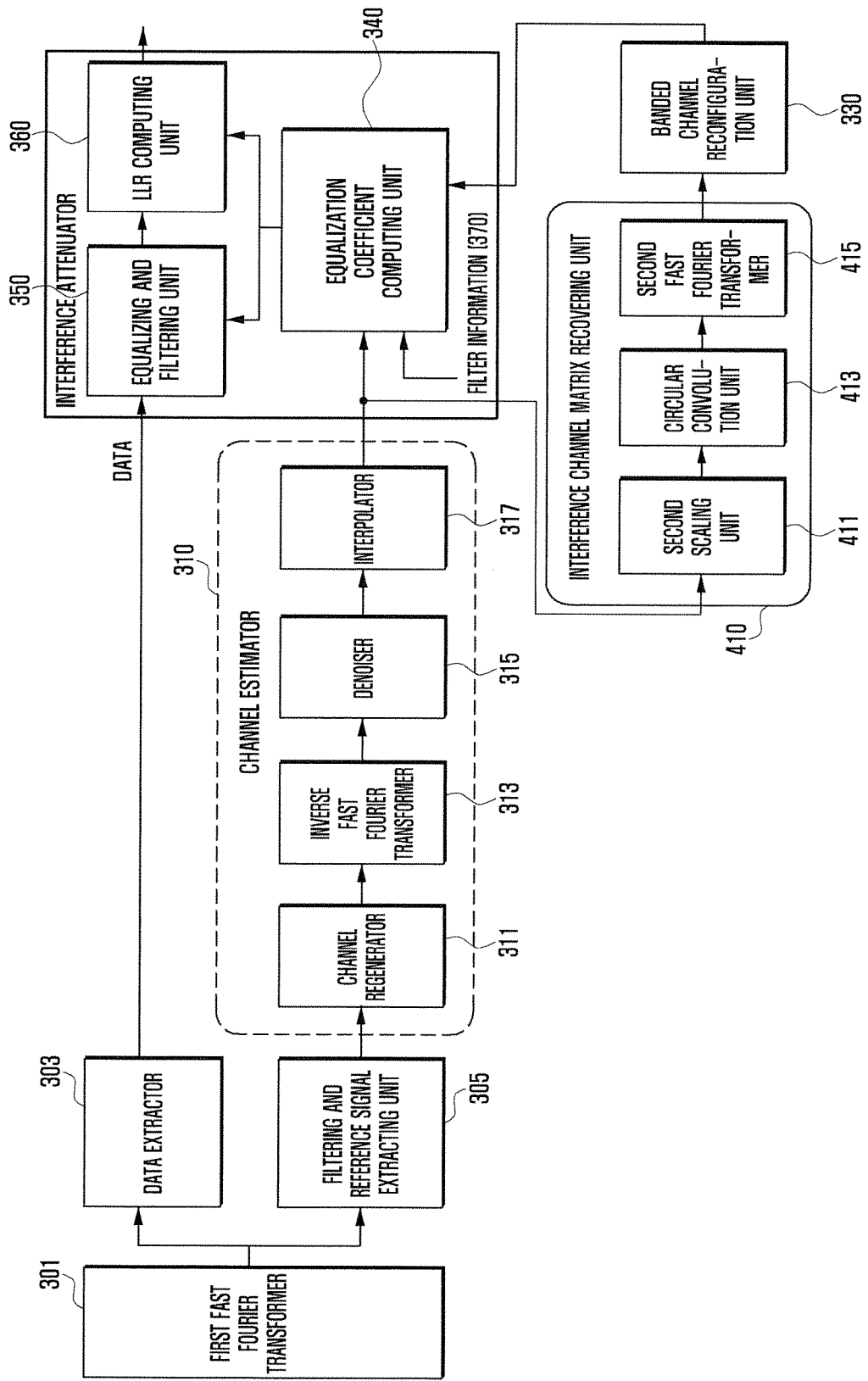
FIG. 4 is a block diagram illustrating a configuration for compensating for the desired FBMC symbol by recovering the interference channel of the FMBC symbol from a frequency base channel according to an embodiment of the present invention.

FIG. 4 is a block diagram illustrating a configuration for compensating for the desired FBMC symbol by recovering the interference channel of the FMBC symbol from a frequency base channel according to an embodiment of the present invention.

Figure 3:
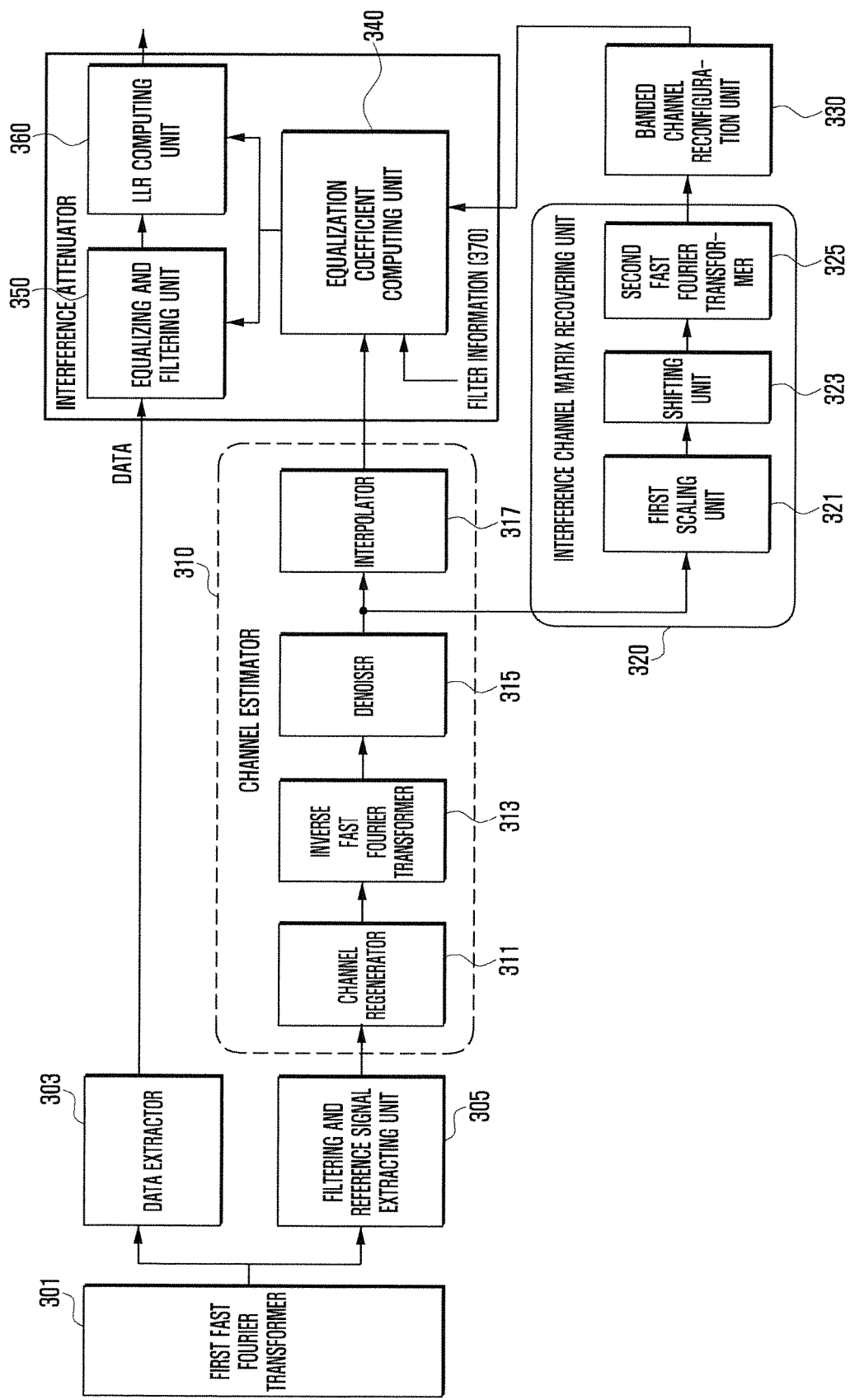
FIG. 3 is a block diagram illustrating a configuration for compensating for a desired FBMC symbol by recovering an interference channel of an FMBC symbol from a time base channel according to an embodiment of the present invention.

Referring to FIG. 3, the received signal is output by performing the fast Fourier transform on the FBMC symbol received in a first fast Fourier transformer 301. As such, a signal of a time domain may be converted into a signal of a frequency domain by allowing the first fast Fourier transformer 301 to perform the fast Fourier transform. As such, the FBMC symbol converted into the frequency domain signal is output to a data extractor 303 and a filtering and reference signal extractor 305, respectively. The data extractor 303 extracts only data from the FMBC symbol on the frequency domain. Further, the filtering and reference signal extractor 305 extracts only a reference signal from the FMBC symbol on the frequency domain. The data extractor 303 and the filtering reference signal extractor 305 may be collectively called a "signal extractor".

The extracted reference signal is input to a channel extractor 310. The channel estimator 310 is configured to include a channel regenerator 311, an inverse fast Fourier transformer 313, a denoiser 315, and an interpolator 317. The channel regenerator 3111 may use a least square scheme to estimate a channel to which the reference signal is transmitted. The signal regenerated in the channel state by the least square scheme is input to the inverse fast Fourier transformer 313. The inverse fast Fourier transformer 313 converts the signal of the frequency domain into the signal of the time domain again and outputs the signal. The signal converted into the time domain is output while noise thereof is removed by the denoiser 315.

In this case, according to the present invention, the signal of the time domain of which the noise is removed among the outputs of the channel estimator 310 is input to an interference channel matrix recovering unit 320. Further, the signal without noise is removed is input to the interpolator 317. The interpolator 318 may perform interpolation in the time domain on the signal without noise, perform the fast Fourier transform on the interpolated signal, and perform the interpolation in the frequency domain to output the signal. In this case, the obtained channel is a channel corresponding to the diagonal components of the symbol.

Meanwhile, the interference channel matrix recovering unit 320 may be configured to include a scaling unit 321, a shifting unit 323, and a second fast Fourier transformer 325. The interference channel matrix recovering unit 320 may select the size of the band to estimate the banded channel having a form as illustrated in FIG. 2B. In this case, the size of the band may be set in consideration of a delay profile and a filter confinement value of the channel.

An operation performed by the interference channel matrix recovering unit 320 may be represented by the following Equation 1. For example, as a formula of generating the diagonal and non-diagonal components of next symbols acting as the non-diagonal components and interference of the desired symbol, a function of the symbol index k and the distance d from the diagonal components is given. Further, the diagonal and non-diagonal components of next symbols acting as the non-diagonal components and interference of the desired symbol are generated based on the diagonal components of the desired symbol.

[Equation 1]
$$[H(k)]_{(l,d)} = FFT\left\{ cirshift\left( Vec\left\{ h[l]\left( \frac{N-l-kM^{sinc\left(\frac{d(N-l-kM)}{N}\right)}}{sinc\left(\frac{d}{N}\right)} e^{-j\pi \frac{d(N-l-kM-1)}{S}} \right) \right\}, kM \right) \right\}$$

Here, $h[l] (l=0, 1, \ldots, L_c-1,)$ is the multipath fading channel and is a vector of a length of Lc. Further, $Vec\{\cdot\}$ makes a vector having a size of N×1 by inserting 0 and circshift (a, n) is a function of circularly shifting a vector a by n. Here, k is an index changed from 0 to L−1 as indexes of the desired symbol and next adjacent symbol and k=0 means the desired FBMC symbol. In the case of generating the diagonal components, d=0, in which d means the distance from the diagonal components and may have a value ranging from −N/2 to N/2−1 but in the present invention, is limited to a value ranging from −BL to BL.

When estimating the time base channel from the diagonal components of the desired symbol, a value corresponding to $$Vec\left\{ h[l]\left(\frac{N-l}{N}\right) \right\}$$

may be obtained. Comparing with the above <Equation 1>, the frequency base channel may be generated by the scaling depending on the adjacent symbol index k and the distance from the diagonal component and the fast Fourier transform after the circular shift by kM depending on the adjacent symbol index. Here, M is a Fourier transform size prior to L times over-sample and is determined on how much the overlapping transmission is shifted. Therefore, the shift is not required when the non-diagonal component of the desired symbol is configured. Further, in the case of OQAM/FBMC, it becomes a value of K*M/2. k is not 0 at the time of generating the diagonal components of adjacent symbol and the diagonal components may be generated in the case of d=0. Even the previous symbol may be represented in a form similar to the above <Equation 1>.

The output of the channel matrix recovering unit 320 calculated by the above <Equation 1> is input to the banded channel reconfiguration unit 330. The banded channel reconfiguration unit 330 may reconfigure the channel in the form as illustrated in FIG. 2C. That is, the vector having a length of N like the above <Equation 1> is generated while changing d for each symbol and suppose that FIG. 2C conceptually illustrates the configuration of the banded channel of FIG. 2B. Next, to make the banded channel as illustrated in FIG. 2B, actually, the generated vector are made into the diagonal matrix and then is circularly shifted by d to make one non-diagonal component. Next, the generation of the non-diagonal component is repeatedly performed by 2B while changing 2B to generate the non-diagonal components by the desired number. The banded channel as illustrated in FIG. 2B may be obtained by adding the generated diagonal components to the 2B non-diagonal components.

In the case of reconfiguring the channel of the desired symbol and the interference symbol using the banded channel as illustrated in FIG. 2B, the energy distribution of two different edges in parallel with the diagonal direction of the square needs to be determined in addition to the central position at which the FBMC symbol is actually transmitted. When the energy distribution is determined as described above, as illustrated in FIG. 2C, regions 220a and 230a that are not included at the time of configuring a specific band in a window form are present. When moving the regions as indicated by reference numerals 221 and 231 to be represented in the window form, the regions are moved toward corresponding edges to be reconfigured in a form as 220b and 230b having energies.

The banded channel data configuring 2L banded channels in the banded channel reconfiguration unit 220 by the method described in FIG. 2C are input to an equalization coefficient computing unit 340. The equalization coefficient computing unit 340 corrects the channel by using the signal input from the interpolator 317, the signal input from the banded channel reconfiguration unit 330, and preset filter information 370. An operation performed in the equalization coefficient computing unit 340 may be represented by any one of the following Equations 2 to 4.

$$G_{B,MMSE,1} \triangleq \left(\hat{H}^H[0]\hat{H}[0] + \sigma_{i+n}^2 I\right)^{-1} \hat{H}^H[0] \quad [\text{Equation 2}]$$

$$G_{B,MMSE,2} \triangleq \left(\sum_{k=-L}^{L-1} \hat{H}^H[k]\hat{H}[k] + \sigma_n^2 I\right)^{-1} \hat{H}^H[0] \quad [\text{Equation 3}]$$

$$G_{B,MMSE,3} \triangleq \hat{H}^H[0]\left(\sum_{k=-L}^{L-1} \hat{H}[k]P_T P_T^H \hat{H}^H[k] + \sigma_n^2 I\right)^{-1} \quad [\text{Equation 4}]$$

Above Equation 2 may be one of equalization methods changed in the equalization coefficient computing unit 340 according to the present invention, and Equations 3 and 4 may be equalization methods that are newly available in the equalization coefficient computing unit 340 according to the present invention. That is, in Equation 2, the existing noise variance $\sigma_n^2$ to an 1-tap MMSE using only the diagonal component of the desired symbol is changed to the noise and interference variance $\sigma_{i+n}^2$, and it is possible to perform equalization using the channel information Ĥ[k] of an adjacent symbol as in Equations 3 and 4. Here, in the case of using only the diagonal component of the adjacent symbol, in Equation 3, the 1-tap equalizer is used like Equation 2, but different interference information per subcarrier may be additionally considered. Further, in the case of reconfiguring the banded matrix, the banded type equalizer structure is used. In the case of Equation 4, the filter coefficient is also considered at the time of configuring the equalizer. By considering the filter together with the channel, it is possible to improve performance of the equalizer.

Here, considering the filtering may be performed by defining a matrix as PT, the matrix having a size of N×M and formed by collecting the filter coefficients, and multiplying the interference channel by the transmitting filter matrix PT and $P_T^H$ as the receiving filter matrix. In the case of performing the equalization after the filtering, the channel shown after the transmission and reception filtering is equalized. In Equations 2 and 3, Ĥ[k] is replaced with $P_T^H \hat{H}[k] P_T$, and at the time of configuring the received signal, the filtering is performed after the equalization, which may be represented by removing $P_T^H$ from Equation 5. The interference channel used herein is a channel reconfigured according to the present invention.

In the present embodiment, only the banded type equalizer is considered, however, a block type equalizer may also be considered, the block type equalizer considering K tap for each position of the subcarrier to be equalized using the regenerated interference channel. Determination on whether to use the banded matrix or the block type has a trade-off relationship with a computation amount and performance of the receiver.

In the case of applying the present invention as described above, the diagonal matrix of the adjacent symbols is considered as well as the diagonal matrix of the desired symbols, or the channel of the desired symbol and the channel of the adjacent symbol have a banded structure. Therefore, even in the case of the 1-tap equalizer, the interference power or the interference channel may be considered. This may be utilized at the time of computing a log likelihood ratio (LLR).

The received signal that is filtered after the equalization may be represented by Equation 5 below. That is, it is a received signal of the case in which the received signal $\underline{X}_R[0]$ of a frequency base is equalized with a GMMSE, and then filtered using a filter corresponding to an m-th subcarrier.

$$\tilde{D}_m[0] = \underline{P}_{T,m}^H G_{MMSE} \underline{X}_R[0] \quad [\text{Equation 5}]$$
$$= \underline{P}_{T,m}^H G_{MMSE} H[0] \underline{P}_{T,m} D_m[0] + \tilde{\omega}_m[0]$$

Here, a gain of the equalized and filtered signal may be represented by $\underline{P}_{T,m}^H G_{MMSE} H[0] \underline{P}_{T,m} \triangleq \gamma_m$, and $\tilde{\omega}_m[0]$ corresponds to a received noise and interference signal. The received noise and interference signal may be represented by Equation 6 again:

$$\tilde{\omega}_m[0] = \sum_{m'=0, m' \neq m}^{M-1} \underline{P}_{T,m}^H G_{MMSE} H[0] \underline{P}_{T,m'} D_{m'}[0] + \quad [\text{Equation 6}]$$
$$\sum_{k \neq 0}^{L} \sum_{m'=0}^{M-1} \underline{P}_{T,m}^H G_{MMSE} H[k] \underline{P}_{T,m'} D_{m'}[k] +$$
$$\underline{P}_{T,m}^H G_{MMSE} \underline{W}[0].$$

In Equation 6, m' represents a subcarrier index that does not correspond to m. A first configuration element is an interference component generated from the non-diagonal component of the desired symbol, and a second configuration element means an interference generated from the diagonal and non-diagonal components of the adjacent symbol, and the last configuration element that is a component generated by noise is colored noise of which a variance per subcarrier is changed by the equalizer. Here, an average of the noise and interference is 0, thus the variance is defined as $E(\tilde{\omega}_m \tilde{\omega}_m^*) \triangleq \sigma_{\omega m}^2$, where * means conjugation. Assuming that an index [0] that means the desired symbol is removed and the noise and interference distribution is Gaussian, the LLR for a j-th bit bj at the m-th subcarrier may be represented by Equation 7 below:

$$\Lambda_m(b_j) = \log \frac{P(b_j = 0 | \tilde{D}_{m,\gamma m})}{P(b_j = 1 | \tilde{D}_{m,\gamma m})} \approx \quad [\text{Equation 7}]$$
$$\frac{\gamma_m^2}{\sigma_{\tilde{\omega}_m}^2}\left(\underset{D_m \in A_j^0}{\text{argmin}}\left|\frac{\tilde{D}_m}{\gamma_m} - D_m\right|^2 - \underset{D_m \in A_j^1}{\text{argmin}}\left|\frac{\tilde{D}_m}{\gamma_m} - D_m\right|^2\right).$$

Here, when using Bayers' rule and max-log approximation, it may be represented as Equation 7. $A_j^0$ and $A_j^1$ mean a set of symbols in which the j-th bit may be 0 or 1. The noise and signal distribution may be obtained from the above-described Equation 6. In this case, depending on the available information, that is, the channel matrix is given as an estimated or recovered channel Ĥ[k], and in the case of using the present invention, it is possible to configure a signal-to-interference and noise ratio (SINR) per subcarrier by recovering the diagonal component of the interference channel or configuring the banded type of desired symbol and interference symbol. Further, this value is used as an input value of an LLR computing unit. That is, the SINR per subcarrier is determined by the recovered channel, the equalizer and the filter, and a variance of white Gaussian noise.

The coefficient of the equalizer that is computed by the equalization coefficient computing unit 340 and the SINR per subcarrier are input to an equalizing and filtering unit 350 and the LLR computing unit 360. The equalizing and filtering unit 350 may perform equalization and filtering with respect to the data symbols extracted by the data extractor 303 using the signal received from the equalization coefficient computing unit 340.

The signal filtered by the equalizing and filtering unit 350 is input to the LLR computing unit 360. The LLR computing unit may compute an LLR of the information input from the equalization coefficient computing unit 340 and the data equalized and output by the equalizing and filtering unit 350 to recover the desired data.

When recovering to the FBMC data symbol by recovering the interference channel of the FBMC symbol from the time base channel as shown in FIG. 3, it is possible to compute the interference power per subcarrier, and in the case of using the existing equalizer EQ, as the interference power is changed, the LLR value is changed. Further, in the case of using a new equalizer (EQ), it is also possible to compute the interference power depending on the channel and the equalizer. In addition, according to the present invention, a desired parameter in addition to the interference power may be extracted, and a required parameter in addition to the interference power may vary depending on the interference distribution. Further, in the embodiment of the present invention, the Gaussian distribution was assumed to obtain the SINR by the interference power. However, modification into another form may be made by a person having ordinary skill in the art by using the spirit of the present invention.

FIG. 4 is a block diagram illustrating a configuration for compensating for the desired FBMC symbol by recovering the interference channel of the FMBC symbol from the frequency base channel according to an embodiment of the present invention.

When comparing with FIG. 3, the configuration in FIG. 4 corresponds to the case in which the output of the channel estimator 310 is input to an interference channel matrix recovering unit 410. That is, the output in the interpolator 317 is a signal that is fast Fourier transformed again as described above, thus is a signal in a frequency domain.

The interference channel matrix recovering unit 410 needs to configure the channel matrix using the signal in the frequency domain, thus may include a second scaling unit 411, a circular convolution unit 413, and a phase shifting unit 415. Here, the second scaling unit represents a first scaling in FIG. 3 on the frequency base with the distanced from the diagonal component and the function of the index k of the adjacent symbol in FIG. 3, the circular convolution with the diagonal component of the frequency base channel of the desired symbol is made, thereby configuring the non-diagonal component of the desired symbol, and in the case of adjacent symbol, an additional phase shift is required.

When comparing with FIG. 3, the configuration in FIG. 4 is a method of converting an operation in the time domain in FIG. 3 into an operation in the frequency domain, and the remainder may have the same configuration and perform the same operation.

In FIGS. 3 and 4 described above, the configuration for attenuating interference has been described. In FIGS. 3 and 4, the configuration of the interference attenuator may be replaced with an interference remover to remove the interference of the FBMC symbol. That is, the interference may be removed using the estimated and reconfigured interference channel. In this case, the interference remover may be configured to have a form of a symbol level interference remover and a code level interference remover, each of which will be described with reference to the accompanying drawing.

Figure 5:
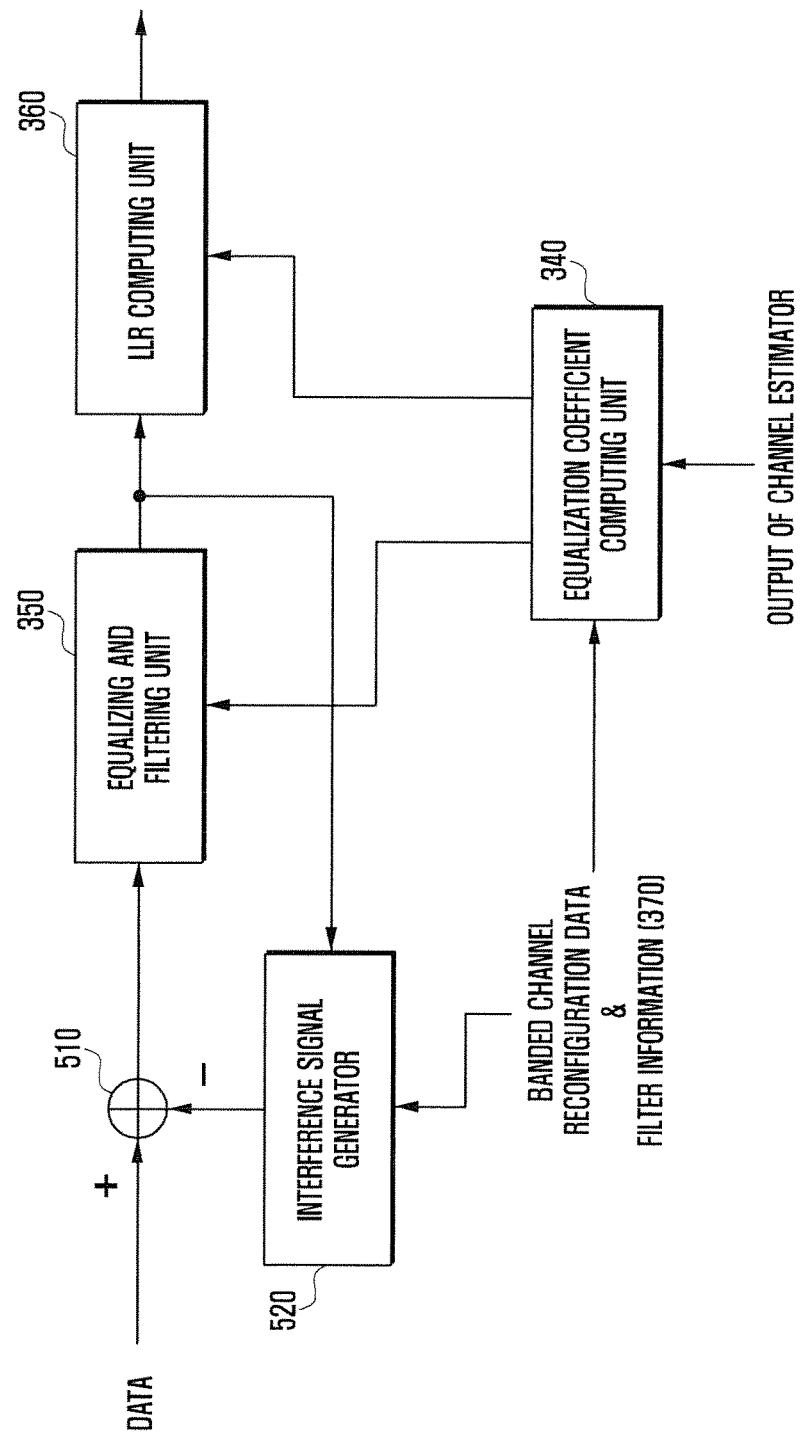
FIG. 5 is an exemplified diagram of a symbol level interference remover for replacing an interference attenuator of the FBMC symbol according to the present invention.

FIG. 5 is an exemplified diagram of a symbol level interference remover for replacing the interference attenuator of the FBMC symbol according to the present invention. In FIG. 5, it is to be noted that the configurations that are the same as those in FIGS. 3 and 4 were denoted by the same reference numerals.

Referring to FIG. 5, data input by the symbol level interference remover means data extracted by the data extractor 303 in FIGS. 3 and 4. Further, banded channel reconfiguration data input by the symbol level interference remover are data reconfigured as the banded channel by the banded channel reconfiguration unit 330, and the filter information 370 is information of the filter selected by the transmitting apparatus or the receiving apparatus. Last, the output of the channel estimator 310 is input to the equalization coefficient computing unit 340.

An interference signal generator 520 generates a signal of the interference channel using the banded channel reconfiguration data and the filter information at the time of initial operation and outputs the generated signal to an addition unit 510. The addition unit 510 may remove (compute a difference) the interference signal output from the interference signal generator 520 from the data to remove the interference signal. The data of which the interference signal is removed by the addition unit 510 are input to the equalizing and filtering unit 350.

The equalizing and filtering unit 350 may perform equalization and filtering by using the equalization coefficient computed in the equalization coefficient computing unit 340 as described above. This is the same as described in FIGS. 3 and 4, thus additional description therefor will be omitted. The output of the equalizing and filtering unit 350 is fed back to the interference signal generator 520 and simultaneously, is input to the LLR computing unit 360.

As such, in the case in which the feedback signal from the equalizing and filtering unit 350 to the interference signal generator 520 is present, the interference signal generator 520 may generate the interference signal in consideration of the feedback signal. For example, the interference signal generator 520 may use the feedback signal to generate the interference signal again in a form of considering the interference channel for the banded channel reconfiguration data. In this case, if needed, the equalization coefficient computing unit 340 may also additionally compute the equalization coefficient by using the information fed back from the equalizing and filtering unit 350.

Figure 6:
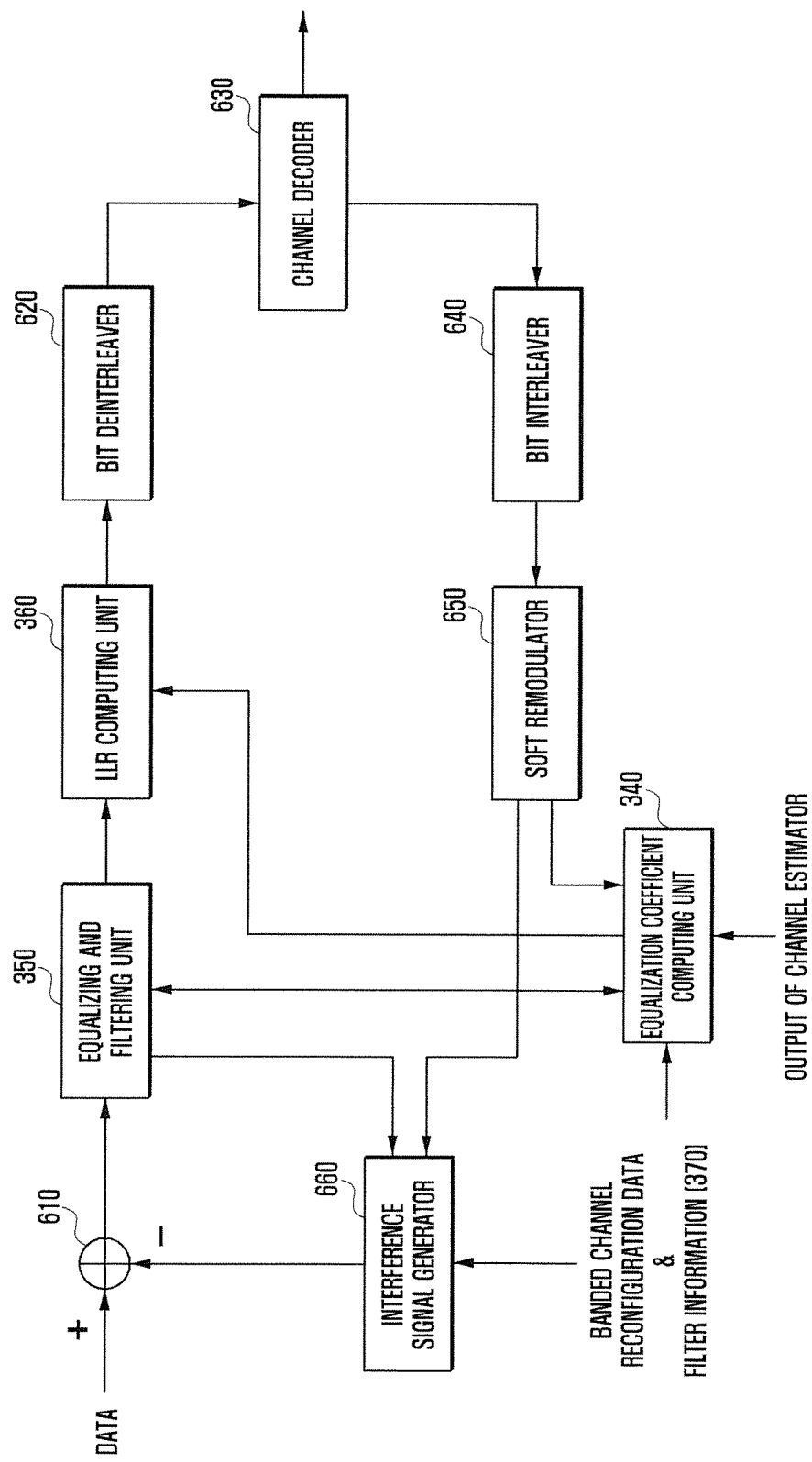
FIG. 6 is an exemplified diagram of a code level interference remover for replacing the interference attenuator of the FBMC symbol according to the present invention.

FIG. 6 is an exemplified diagram of a code level interference remover for replacing the interference attenuator of the FBMC symbol according to the present invention. In FIG. 6, it is to be noted that the configurations that are the same as those in FIGS. 3 and 4 were denoted by the same reference numerals.

Referring to FIG. 6, data input by the code level interference remover means data extracted by the data extractor 303 in FIGS. 3 and 4. Further, banded channel reconfiguration data input by the code level interference remover are data reconfigured as the banded channel by the banded channel reconfiguration unit 330, and the filter information 370 is information of the filter selected by the transmitting apparatus or the receiving apparatus. Last, the output of the channel estimator 310 is input to the equalization coefficient computing unit 340.

The interference signal generator 660 generates a signal of the interference channel using the banded channel reconfiguration data and the filter information at the time of initial operation and outputs the generated signal to an addition unit 610. The addition unit 610 may remove (compute a difference) the interference signal output from the interference signal generator 660 from the data to remove the interference signal. The data of which the interference signal is removed by the addition unit 610 are input to the equalizing and filtering unit 350.

The equalizing and filtering unit 350 may perform equalization and filtering by using the equalization coefficient computed in the equalization coefficient computing unit 340 as described above. This is the same as described in FIGS. 3 and 4, thus additional description therefor will be omitted. The output of the equalizing and filtering unit 340 is input to the LLR computing unit 360. When comparing with FIG. 5, FIG. 5 is a case of removing the symbol level interference, and FIG. 6 is a case of removing the code level interference. Thus, fed back information and feedback positions in FIGS. 5 and 6 are different from each other.

That is, in FIG. 6, the LLR value computed in the LLR computing unit 360 is deinterleaved in a bit unit in a bit deinterleaver 620. Here, the deinterleaving in the bit unit is an inverse process of the process of interleaving in the bit unit in the transmitting apparatus.

An output of the bit deinterleaver 620 is channel-decoded by a channel decoder 630. The channel decoder 630 may have various forms according to the channel decoding scheme, and in the present invention, the channel decoding scheme and encoding scheme are not particularly limited. Therefore, any one of various known channel decoders may be used.

Further, a value channel-decoded in the channel decoder 630 may be used as data if an error does not exits, and if an error exists, a repetitive decoding may be performed. Description will be made under the assumption that the repetitive decoding is performed.

At the time of repetitive decoding in the channel decoder 630, the output of the channel decoder may be input to a bit interleaver 640. The bit interleaver 640 interleaves the output of the channel decoder in the bit unit to be input to a soft remodulator 650. The soft remodulator soft-remodulates the data obtained by interleaving the output of the channel decoder 630 and outputs the soft-remodulated data to the interference signal generator 660 and the equalization coefficient computing unit 340.

The equalization coefficient computing unit 340 may update the equalization coefficient by considering the soft-remodulated symbol. The updated equalization coefficient is input to the equalizing and filtering unit 350 and the SINR computed in the equalization coefficient computing unit 340 is input to the LLR computing unit 360.

Further, the interference signal generator 660 updates the banded channel reconfiguration data using an average, or an average and a distribution of the signal that is soft-remodulated in the soft remodulator 650, thereby reconfiguring the interference signal.

As described above, the code level interference remover performs channel-decoding after the LLR is computed, and may configure the interference signal based on the signal detected after the channel decoding and the interference channel reconfigured according to the present invention, and remove the configured interference signal.

In the case of using the interference removers to which the present invention is applied in FIGS. 5 and 6 described above, more information on the interference channel may be used, thereby making it possible to effectively remove the interference in the FBMC system.

Figure 7:
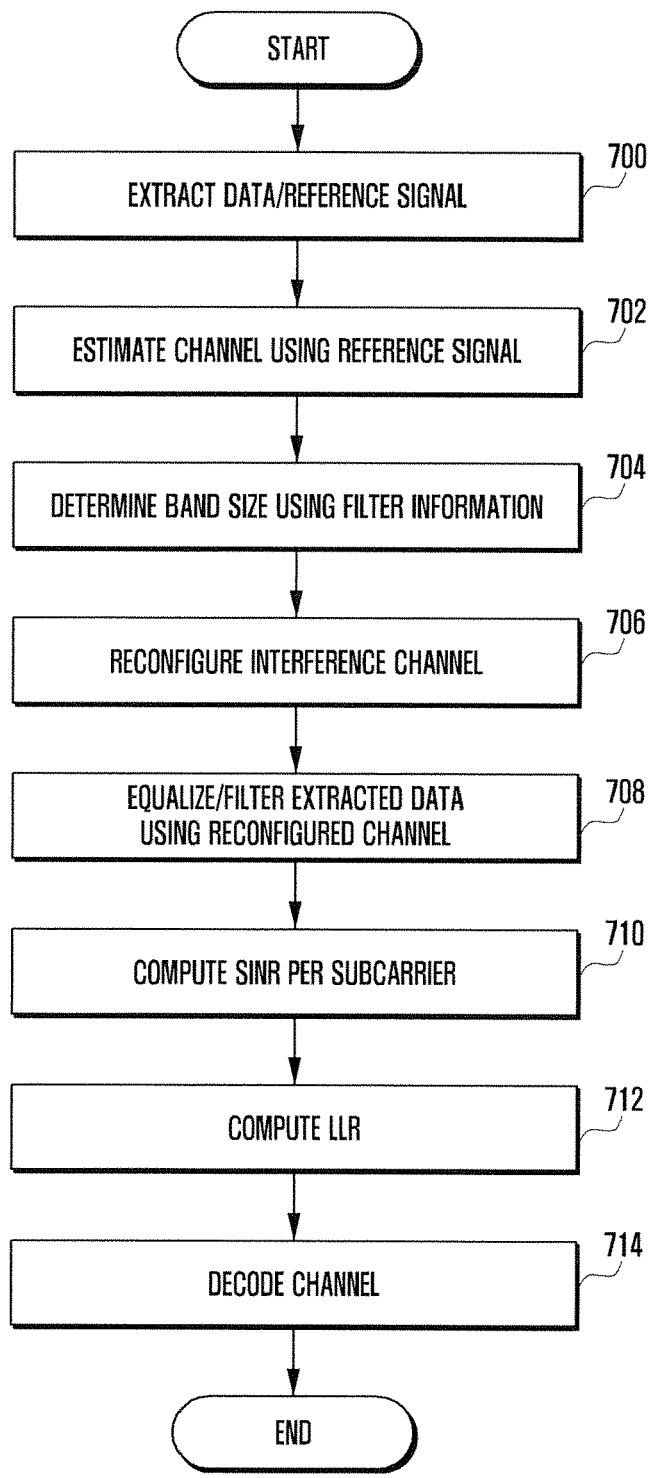
FIG. 7 is a flow chart of a control at the time of channel estimation and data recovery in a receiving apparatus of the FMBC system according to the present invention.

FIG. 7 is a flow chart of a control at the time of channel estimation and data recovery in a receiving apparatus of the FMBC system according to the present invention.

Referring to FIG. 7, the receiving apparatus of the FBMC system may extract data and a reference signal by receiving the FBMC symbol in step 700. Here, according to the configuration of the system, it is possible to first extract the reference signal only, or it is also possible to extract the reference signal and the data together when they are mixed with each other. Then, the receiving apparatus may estimate the channel using the reference signal such as a pilot signal in step 702. If the channel is estimated, the diagonal component of the desired symbol may be obtained as can be seen in FIG. 2B.

Then, the receiving apparatus may determine a band size depending on a frequency-selective characteristic of the channel and a degree of confinement of the filter in step 704. Here, when the band size is 1, only the diagonal component is considered. After determining the band size, the receiving apparatus may recover the interference channel from the channel estimated in step 706. Here, the interference channel is composed of the non-diagonal component of the desired symbol and the diagonal component and non-diagonal component of the adjacent symbol. Therefore, the recovery of the interference channel may include the time base channel of the desired symbol, the scaling, the circular shift, and the fast Fourier transform (FFT).

Here, the scaling value may be changed depending on the index k of the adjacent symbol and the distance d from the diagonal component, and a degree of circular shift may be changed depending on the index k of the adjacent symbol.

This may be computed by Equation 1, and it may be a process of generating a channel corresponding to a line of one non-diagonal component that is spaced apart from the diagonal component by a predetermined distance as described above.

This has been described in FIGS. 2B and 2C in more detail, thus description therefor will be omitted.

Then, the receiving apparatus may equalize and filter the data extracted using the reconfigured channel in step 708. Here, the filtering may be performed after the equalization, and the equalization may be performed after the filtering. After performing the equalization and filtering, the receiving apparatus may obtain the equalization coefficient and the SINR per subcarrier in consideration of the filter information and the information of the interference channel in step 710. Here, the equalization coefficient may be computed in the equalizer.

The receiving apparatus may compute the LLR under the assumption of Gaussian distribution by using the equalized and filtered signal and the effective SINR in step 712. Then, the receiving apparatus may decode the desired data through channel decoding in step 714.

FIG. 7 described above includes both the case of the interference channel recovery from the time base channel, and the case of the interference channel recovery from the frequency base channel.

Next, an operation for setting the filter information from the angle of the receiving unit and the transmitting unit will be described.

Figure 8:
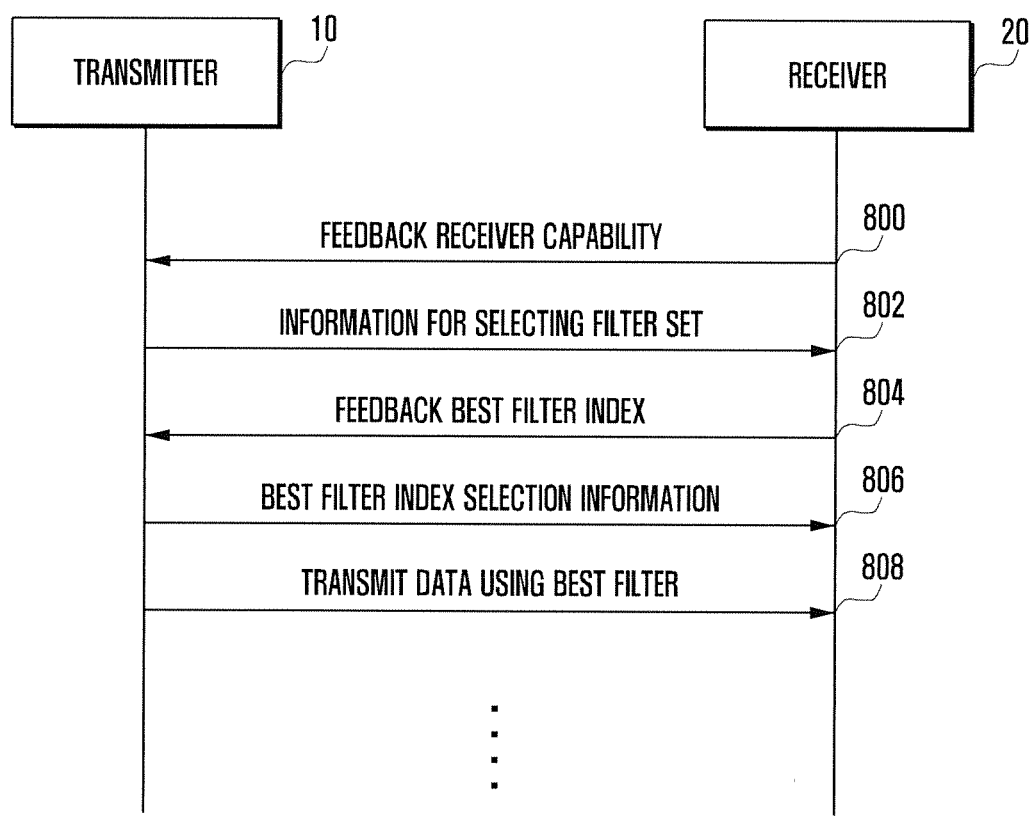
FIG. 8 is a flow chart of a signal for setting a filter information between the transmitter and the receiver and transmitting and receiving data based on the set filter information.

FIG. 8 is a flow chart of a signal for setting the filter information between the transmitter and the receiver and transmitting and receiving data based on the set filter information.

In FIG. 8, a transmitter 10 may generally be NodeB or eNB, and a receiver 20 may be user equipment (UE). It will be apparent for those skilled in the art that vice versa. Further, it may also be similarly applied to other general transmitters and receiver.

The receiver 20 may feed back UE capability information of a terminal at the time of set up of RRC connection with the transmitter 10 in step 800. In this case, the fed back information may include an available band size of the UE, a kind of equalizer (EQ) (banded or block), etc. Then the transmitter 10 selects a parameter in consideration of other UEs adjacent to the receiver 20 and transmits the selected parameters to the receiver 20 in step 802. Here, the selected parameter may limit an available filter set to notify filter set information or may include information (fall-off rate, the number of non-zero coefficient, etc.) for limiting the filter set to notify the information.

Then, the receiver 20 receives the information on the filter set and performs the channel estimation and reconfiguration of the interference channel in step 802. Then, the receiver 20 selects a best filter in which the SNR or the SINR becomes maximum, and the selected best filter index or information may be transmitted to the transmitter 10 in step 804.

As such, the receiver 20 transmits the best filter index or the information to the transmitter, such that it is possible to select a best filter at the time of data reception by the receiver 20 actually receiving data.

The transmitter 10 transmits information for confirming the use of the best prototype filter by which data will be transmitted to the receiver 20 in step 806.

The receiver 20 receiving the information for confirming the use of the best prototype filter may be set to receive data to be received later using the best prototype filter. The information may be the filter information 370 described in FIGS. 3 and 4.

Then, the transmitter 10 transmits the data to be transmitted to the receiver 20 so that the data may be received by using the best filter in step 808. Then, the receiver 20 selects a band size depending on the number of non-zero coefficient, a channel, and required performance, and performs channel estimation and interference channel recovery. Further, by performing equalization and computing the LLR using the recovered interference, the data reception performance may be improved.

The exemplary embodiments of the present invention disclosed in the present specification and the accompanying drawings have been provided merely as specific examples in order to assist in understanding of the present invention and do not limit the scope of the present invention. Therefore, the scope of the present invention should be interpreted that all the modifications or changed forms derived based on the technical idea of the present invention are included in the scope of the present invention.

INDUSTRIAL APPLICABILITY

The present invention may be used to attenuate or remove interference of a channel in a filter bank multicarrier (FBMC) wireless communication system.

The invention claimed is:

1. A method for attenuating interference of a signal received in a receiver of a filter bank multicarrier (FBMC) system, the method comprising:

separately extracting data and a reference signal in a received FBMC symbol;

obtaining a diagonal element channel of a desired symbol through a channel estimation from the extracted reference signal;

generating an interference channel matrix of a non-diagonal component of the desired symbol, a diagonal component of an interference symbol, and a non-diagonal component of the interference symbol using a channel estimated diagonal component;

reconfiguring to a banded channel matrix using the interference channel matrix; and attenuating the interference contained in the extracted data using reconfigured banded channel matrix information and filter information of a transmitter of the filter bank multicarrier system.

2. The method of claim 1, further comprising:

after the obtaining of the diagonal element channel, determining a band size based on at least one of a filter confinement value, an over-lapping factor L, or an energy distribution characteristic of a filter used in the transmitter.

3. The method of claim 2, wherein the attenuating of the interference includes:

computing an equalization coefficient and an effective signal-to-interference and noise ratio (SINR) in consideration of an equalizer and the filter using the reconfigured banded channel matrix information;

equalizing and filtering the data using the computed equalization coefficient; and computing a log likelihood ratio (LLR) using the equalized and filtered data and the effective SINR.

4. The method of claim 1, wherein the channel estimated diagonal component is a channel in a time domain.

5. The method of claim 4, wherein the generating of the interference channel matrix includes scaling, circular shifting, and fast Fourier transforming the channel obtained in the time domain from the diagonal component of a desired symbol block of the desired symbol.

6. The method of claim 1, wherein the channel estimated diagonal component is a channel in a frequency domain.

7. The method of claim 6, wherein the generating of the interference channel matrix includes scaling, circular convolution, and phase shifting the channel obtained in the frequency domain from the diagonal component of a desired symbol block of the desired symbol.

8. A receiver of a filter bank multicarrier (FBMC) system for attenuating interference of a received signal, the receiver comprising:

a signal extractor configured to separately extract data and a reference signal in a received FBMC symbol;

a channel estimator configured to obtain a diagonal element channel of a desired symbol through a channel estimation from the extracted reference signal;

an interference channel matrix recoverer configured to generate an interference channel of a non-diagonal component of the desired symbol, a diagonal component of an interference symbol, and a non-diagonal component of the interference symbol using a channel estimated signal;

a bended channel reconfigurer configured to reconfigure to a banded channel matrix using the interference channel; and an interference attenuator configured to attenuate the interference contained in the extracted data using reconfigured banded channel matrix information and filter information of a transmitter of the filter bank multicarrier system.

9. The receiver of claim 8, wherein the interference channel matrix recoverer is configured to determine a band size based on at least one of a filter confinement value, an over-lapping factor L, or an energy distribution characteristic of a filter used in the transmitter.

10. The receiver of claim 9, wherein the interference attenuator includes:
an equalization coefficient computer configured to compute an equalization coefficient and an effective signal-to-interference and noise ratio (SINR) in consideration of an equalizer and the filter using the reconfigured banded channel matrix information;
an equalizer and filter configured to equalize and filter the data using the computed equalization coefficient; and
a log likelihood ratio (LLR) computer configured to compute an LLR using the equalized and filtered data and the effective SINR.

11. The receiver of claim 8, wherein the channel estimated diagonal element channel is a channel in a time domain.

12. The receiver of claim 11, wherein the interference channel matrix recoverer includes:
a scaler configured to scale the channel obtained in the time domain from the diagonal component of a desired symbol block of the desired symbol;
a circular shifter configured to circular shift the scaled channel; and
a fast Fourier transformer configured to fast Fourier transform (FFT) the circular shifted channel to a signal in a frequency domain.

13. The receiver of claim 8, wherein the channel estimated diagonal element channel is a channel in a frequency domain.

14. The receiver of claim 13, wherein the interference channel matrix recoverer includes:
a scaler configured to scale the channel obtained in the frequency domain from the diagonal component of a desired symbol block of the desired symbol;
a circular convolver configured to circular convolve the scaled channel; and
a phase shifter configured to phase shift the circular convolved channel.

15. A method for removing interference of a signal received in a receiver of a filter bank multicarrier (FBMC) system, the method comprising:
separately extracting data and a reference signal in a received FBMC symbol;
obtaining a diagonal element channel of a desired symbol through a channel estimation from the extracted reference signal;
generating an interference channel matrix of a non-diagonal component of the desired symbol, a diagonal component of an interference symbol, and a non-diagonal component of the interference symbol using a channel estimated diagonal component;
reconfiguring to a banded channel matrix using the interference channel matrix;
generating an interference signal using filter information of a transmitter of the filter bank multicarrier system, reconfigured banded channel matrix information, and fed back information; and
computing a difference of the interference signal from the extracted data.

16. The method of claim 15, wherein the fed back information is a signal equalized and filtered at a previous point in time.

17. The method of claim 15, wherein the fed back information is a signal obtained by reconfiguring a signal channel decoded at a previous point in time to a signal before channel decoding.

18. An apparatus for removing interference of a signal received in a receiver of a filter bank multicarrier (FBMC) system, the apparatus comprising:
a signal extractor configured to separately extract data and a reference signal in a received FBMC symbol;
a channel estimator configured to obtain a diagonal element channel of a desired symbol through a channel estimation from the extracted reference signal;
an interference channel matrix recoverer configured to generate an interference channel of a non-diagonal component of the desired symbol, a diagonal component of an interference symbol, and a non-diagonal component of the interference symbol using a channel estimated signal;
a bended channel reconfigurer configured to reconfigure to a banded channel matrix using the interference channel;
an interference signal generator configured to generate an interference signal using filter information of a transmitter of the filter bank multicarrier system, reconfigured banded channel matrix information, and fed back information; and
an adder configured to compute a difference of the interference signal from the extracted data.

19. The apparatus of claim 18, wherein the fed back information is a signal equalized and filtered at a previous point in time.

20. The apparatus of claim 18, wherein the fed back information is a signal obtained by reconfiguring a signal channel decoded at a previous point in time to a signal before channel decoding.

* * * * *